(12) United States Patent
Kaga et al.

(10) Patent No.: US 8,136,365 B2
(45) Date of Patent: Mar. 20, 2012

(54) COOLING APPARATUS HAVING A VARIABLE SPEED COMPRESSOR WITH SPEED LIMITED ON THE BASIS OF A SENSED PERFORMANCE PARAMETER

(75) Inventors: Shinichi Kaga, Toyoake (JP); Takeshi Ueda, Toyoake (JP); Yoshiyasu Suzuki, Toyoake (JP); Akihiko Hirano, Toyoake (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 399 days.

(21) Appl. No.: 11/822,127

(22) Filed: Jul. 2, 2007

(65) Prior Publication Data

US 2009/0007575 A1 Jan. 8, 2009

(51) Int. Cl.
*F25B 1/00* (2006.01)
*F25B 49/00* (2006.01)

(52) U.S. Cl. .......... 62/228.4; 62/126; 62/127; 62/228.1
(58) Field of Classification Search ............... 62/126, 62/127, 108, 228.1, 228.3
See application file for complete search history.

(56) References Cited

U.S. PATENT DOCUMENTS

| | | | |
|---|---|---|---|
| 5,203,179 A * | 4/1993 | Powell | 62/180 |
| 5,263,335 A * | 11/1993 | Isono et al. | 62/228.4 |
| 5,685,163 A * | 11/1997 | Fujita et al. | 62/228.3 |
| 6,035,653 A * | 3/2000 | Itoh et al. | 62/228.4 |
| 6,931,872 B2 * | 8/2005 | Kaga et al. | 62/228.4 |

FOREIGN PATENT DOCUMENTS

| | | |
|---|---|---|
| EP | 0 513 539 A2 * | 11/1992 |
| JP | 54-163054 | 11/1979 |
| JP | 54-163054 | 12/1979 |
| JP | 60-188775 | 12/1985 |
| JP | 63-003220 | 1/1988 |
| JP | 1-179882 | 7/1989 |
| JP | 6-21758 | 3/1994 |
| JP | 10-038441 | 2/1998 |
| JP | 11-173729 | 7/1999 |
| JP | 2000-121177 | 4/2000 |
| JP | 2003-050071 | 2/2003 |

* cited by examiner

*Primary Examiner* — Frantz Jules
*Assistant Examiner* — Daniel C Comings
(74) *Attorney, Agent, or Firm* — Wenderoth, Lind & Ponack, L.L.P.

(57) ABSTRACT

A cooling apparatus such as a refrigerator includes a refrigeration cycle including a compressor driven by an electric motor, a condenser, a throttle valve and an evaporator, a first physical amount detector capable of detecting a physical quantity representing a temperature of an object to be cooled by the cooling operation of the evaporator, a temperature control device capable of controlling a rotating speed of the motor based on the physical quantity detected by the first physical quantity detector so that the object is cooled approximately to a target temperature, a second physical quantity detector capable of detecting a physical quantity corresponding to a performance margin of the refrigeration cycle, and a rotating speed limiter capable of limiting the rotating speed of the motor to or below a predetermined speed based on a physical quantity detected by the second physical quantity detector.

6 Claims, 10 Drawing Sheets

COOLING APPARATUS HAVING A VARIABLE SPEED COMPRESSOR WITH SPEED LIMITED ON THE BASIS OF A SENSED PERFORMANCE PARAMETER

BACKGROUND

I. Technical Field

The present invention relates to a cooling apparatus, more specifically a compressor of a refrigeration cycle driven by an electric motor of the speed control type.

II. Description of the Related Art

JP-H11-173729A and JP-S60-188775A disclose cooling apparatuses of refrigerators. It is known that an inner temperature, which is a temperature inside a cooling apparatus, is detected and a rotating speed of the electric motor is controlled using the detected inner temperature. In this technique, the rotating speed of the motor is controlled so as to be increased as the inner temperature rises, exceeding a set temperature, for example, about 5° C., so that a cooling capacity of the refrigeration cycle is increased, whereupon the inner temperature is kept substantially equal to the set temperature.

In the above-described conventional cooling apparatuses, however, when the inner temperature which is close to a room temperature (which is a temperature in a room where the cooling apparatus is installed), is reduced to a set temperature (such as at the time of installation of a refrigerator), the rotating speed of the motor is increased extremely since quick cooling is carried out at an initial stage under the condition where the difference between a set temperature (4° C., for example) and the inner temperature (15° C., for example) is considerably large. In this state, a large current flows into the motor. In order to allow a large current to flow, an electric motor with a large capacity and a power supply circuit with a large capacity are needed, thereby increasing the sizes of the motor and the power supply circuit. As a result, production costs of the motor and power supply circuit are increased.

In view of the foregoing problem, the conventional art has developed a technique for reducing the capacities of the motor and power supply circuit by utilizing the upper limit of the rotating speed of the motor.

However, the refrigeration cycle of the aforementioned type has a characteristic that the input current is rendered lower at the same rotating speed when a temperature is low in a room where, for example, a refrigerator is installed, than when the temperature is high in the room. However, the rotating speed of the motor is provided with a uniform upper limit in the conventional control manner. As a result, for example, the input current is sufficiently small when the temperature in a room is low. Despite this, there is a case where the rotating speed of the motor reaches an upper limit thereof such that the cooling apparatus cannot deliver its original full cooling capacity. In this case, a useless rotating speed limit is rendered effective so that a time period required to reach a set temperature is prolonged. This means that the refrigerating capacity cannot be utilized effectively.

Thus, there is a need in the art for a cooling apparatus which can deliver an original refrigerating capacity while capacities of the motor and the power supply circuit can be reduced.

SUMMARY

The present invention provides a cooling apparatus comprising a refrigeration cycle including a compressor capable of being driven by an electric motor having a controllable rotating speed, a condenser cooling refrigerant capable of being discharged from the compressor, a throttle valve capable of allowing the refrigerant discharged from the condenser to pass therethrough and an evaporator capable of performing a cooling operation by the refrigerant having passed through the throttle valve, a first physical quantity detector capable of detecting a physical quantity representing a temperature of an object to be cooled by the cooling operation of the evaporator, a temperature control device capable of controlling a rotating speed of the motor based on the physical quantity detected by the first physical quantity detector so that the object is cooled approximately to a target temperature, a second physical quantity detector capable of detecting a physical quantity corresponding to a performance margin of the refrigeration cycle, and a rotating speed limiter capable of limiting the rotating speed of the motor to or below a predetermined speed based on a physical quantity detected by the second physical quantity detector.

According to the above-described arrangement, the object is cooled by the cooling operation of the evaporator. When thermal invasion or the like raises the temperature of the object, the first physical quantity detector (for example, a temperature sensor) detects a physical quantity or the temperature rise of the object. The temperature control device is able to change the rotating speed of the motor according to the detected physical quantity, whereby the object is cooled so that the temperature thereof is approximated to the target temperature.

In the case where the foregoing temperature control is carried out when the temperature of the object differs from a target temperature to a large degree such as in the starting of the cooling apparatus, there is a possibility that an increased motor speed may result in occurrence of a large current. In the above-described cooling apparatus, however, an upper limit of the motor speed can be determined in the following manner for suppression of flow of an excessive current.

The second physical quantity detector can detect a performance margin of the refrigeration cycle. Regarding an operation condition of the refrigeration cycle, the performance margin of the refrigeration cycle can be taken as a balance between a thermal load of the refrigeration cycle and workload of the compressor, and a heat discharge of the condenser. In other words, although two loads are thermally the same, the heat discharge of the condenser is increased when a room temperature is lower, for example. Accordingly, the performance margin is increased. Thus, information about the performance margin of the refrigeration cycle can be obtained when, for example, an air temperature around the cooling apparatus is measured.

Furthermore, when the thermal load is larger as compared with heat discharge of the condenser such that the performance margin of the refrigeration cycle is reduced, the temperature of the condenser is increased. Accordingly, information corresponding to the performance margin of the refrigeration cycle can be obtained, for example, in a case where the second physical quantity detector detects the temperature of the condenser or of the cooling air passing through the condenser. Furthermore, also when the thermal load is larger as compared with heat discharge of the condenser such that the performance margin of the refrigeration cycle is reduced, the refrigerant pressure can be increased in a section of the refrigerant passage between the discharge side of the compressor and the throttle valve in the refrigeration cycle. Accordingly, information corresponding to the performance margin of the refrigeration cycle can be obtained in a case where the second physical quantity detector comprises a pressure sensor measuring the refrigerant pressure.

Thus, according to the present invention, the upper limit of the rotating speed of the motor is determined according the performance margin of the refrigeration cycle. Accordingly, the upper limit of the rotating speed of the motor is increased when the performance margin of the refrigeration cycle is sufficiently high, for example, when the temperature in the room where the cooling apparatus is installed is low. Consequently, the refrigeration cycle performs to the best of its potential, whereby quick cooling can be realized. Additionally, since the upper limit of the rotating speed is set, the rotating speed of the motor can be prevented from being increased more than is necessary even when the temperature of the object to be cooled is high. Thus, the capacity of the motor and accordingly the capacity of the power supply circuit therefor can be suppressed to smaller values.

BRIEF DESCRIPTION OF THE DRAWINGS

Illustrative aspects in accordance with the invention will be described in detail with reference to the following figures wherein.

DETAILED DESCRIPTION

<First Embodiment>

Figure 1:
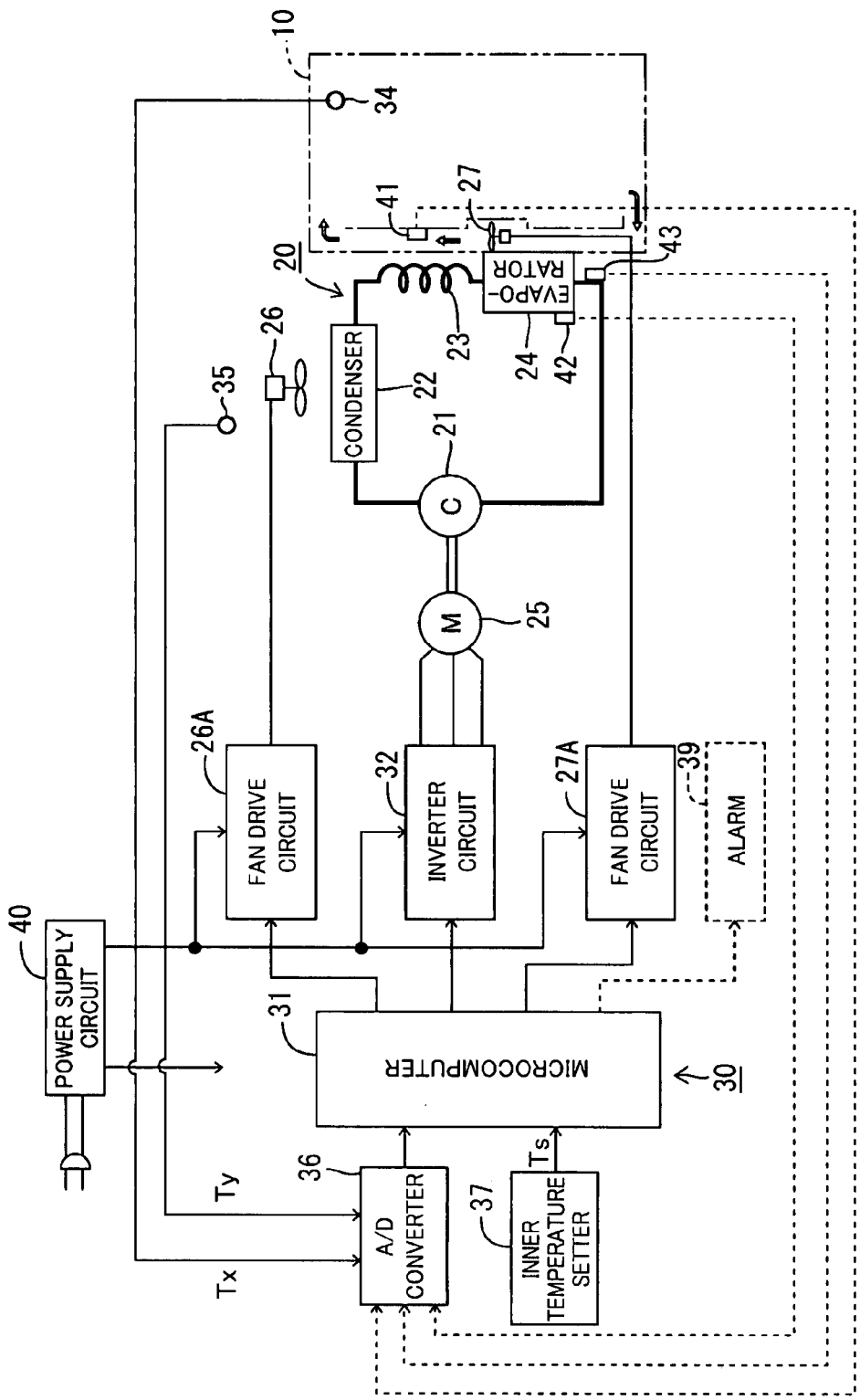
FIG. 1 is a block diagram showing an electrical arrangement of a refrigerator in accordance with a first embodiment of the present invention.

A first embodiment of the present invention will be described with reference to FIGS. 1 to 4. Referring to FIG. 1, a refrigeration cycle 20 and an operation control device 30 for the refrigeration cycle are schematically shown. The refrigeration cycle 20 is provided for cooling atmospheres in storage compartments defined in a heat-insulated box of a refrigerator of the first embodiment. The refrigeration cycle 20 comprises a compressor 21, a condenser 22, a capillary tube serving as a throttle valve and an evaporator 24. The compressor 21 is driven by an electric motor 25 so as to discharge high-temperature and pressure refrigerant gas. A rotating speed of the motor 25 is controlled by an inverter circuit 32 as will be described later. The motor 25 may comprise an AC induction motor or DC brushless motor. The refrigerant gas discharged from the compressor 21 is caused to flow into the condenser 22. A cooling fan 26 takes in air in a room where the refrigerator is installed. The refrigerant gas discharged into the condenser 22 is cooled and liquefied by the cooling operation of the condenser 22. The liquid refrigerant produced by the condenser 22 is decompressed by the capillary tube and then evaporated by the evaporator 24 so that the cooling operation is performed. The refrigerant is then caused to return to the refrigerant suction side of the compressor 21. A fan 27 is provided in a passage (cooling air passage) which accommodates a part or whole of the evaporator 24 and communicates with the storage compartments. The air cooled by the evaporator 24 is circulated by the fan 27 into the storage compartment, thereby cooling the atmosphere in the storage compartment. Arrows in FIG. 1 show flow of air.

The operation control device 30 comprises the inverter circuit 32 delivering current (i.e. variable-frequency alternating) to drive the motor 25, the cooling fan 26, fan drive circuits 26A and 27A driving the fans 26 and 27 respectively, and a microcomputer 31 controlling the fan drive circuits 26A and 27A. The microcomputer 31 has an input port to which the temperature sensors 34 and 35 are connected via an analog-to-digital (A/D) converter 36. A temperature setter 37 is also connected to the input port of the microcomputer 31. Furthermore, the operation control device 30 is provided with a power supply circuit 40 which supplies electric power from an external power supply line or the like to the inverter circuit 32 and fan drive circuits 26A and 27A. The power supply circuit 40 also supplies electric power to various electronic circuits such as the microcomputer 31 and the A/D converter 36 as the need arises.

The inner temperature sensor 34 is located so as to sense an air temperature Tx in the storage compartment of the refrigerator in order to indirectly detect the temperature of an object to be cooled or food accommodated in the storage compartment. Furthermore, a room temperature sensor 35 can be provided, for example, at an inlet side of the cooling fan 26 provided for condenser 22 in order to detect an air temperature Ty in the room, for example when the refrigerator is installed. The room temperature Ty is indicative of a physical quantity corresponding to a performance margin of the refrigeration cycle 20 as will be described later. Accordingly, the room temperature sensor 35 serves as a second physical quantity detector in the invention. The microcomputer 31 is capable of executing a program including processing shown by the flowchart of FIG. 3 as will be described later. As a result, the operation control device 30 is able to function as a temperature control device which controls on-off and a rotating speed of the motor 25 thereby to control the inner temperature Tx so that the inner temperature can be approximated to a target temperature Ts. At the same time, the operation control device 30 is able to function as a rotating speed control device which controls a rotating speed of the motor 25 so that the rotating speed of the motor 25 does not exceed a predetermined upper limit.

Figure 2:
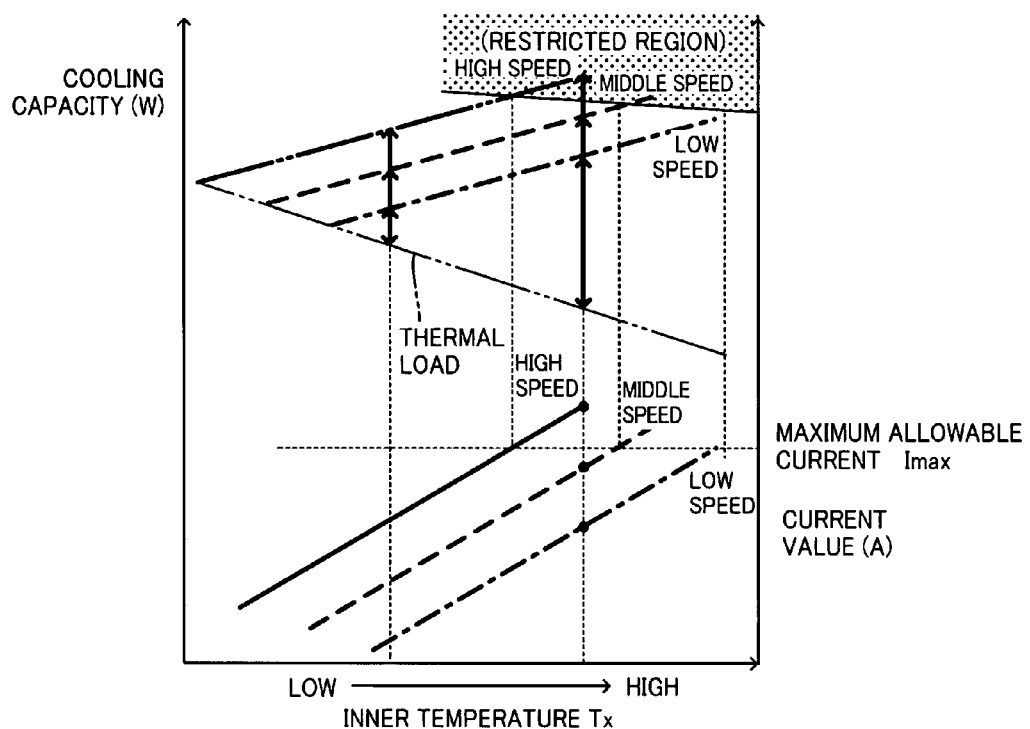
FIG. 2 is a graph showing the relationship among a refrigerating performance of refrigeration cycle, a temperature in a storage compartment of the refrigerator and motor current.
Figure 3:
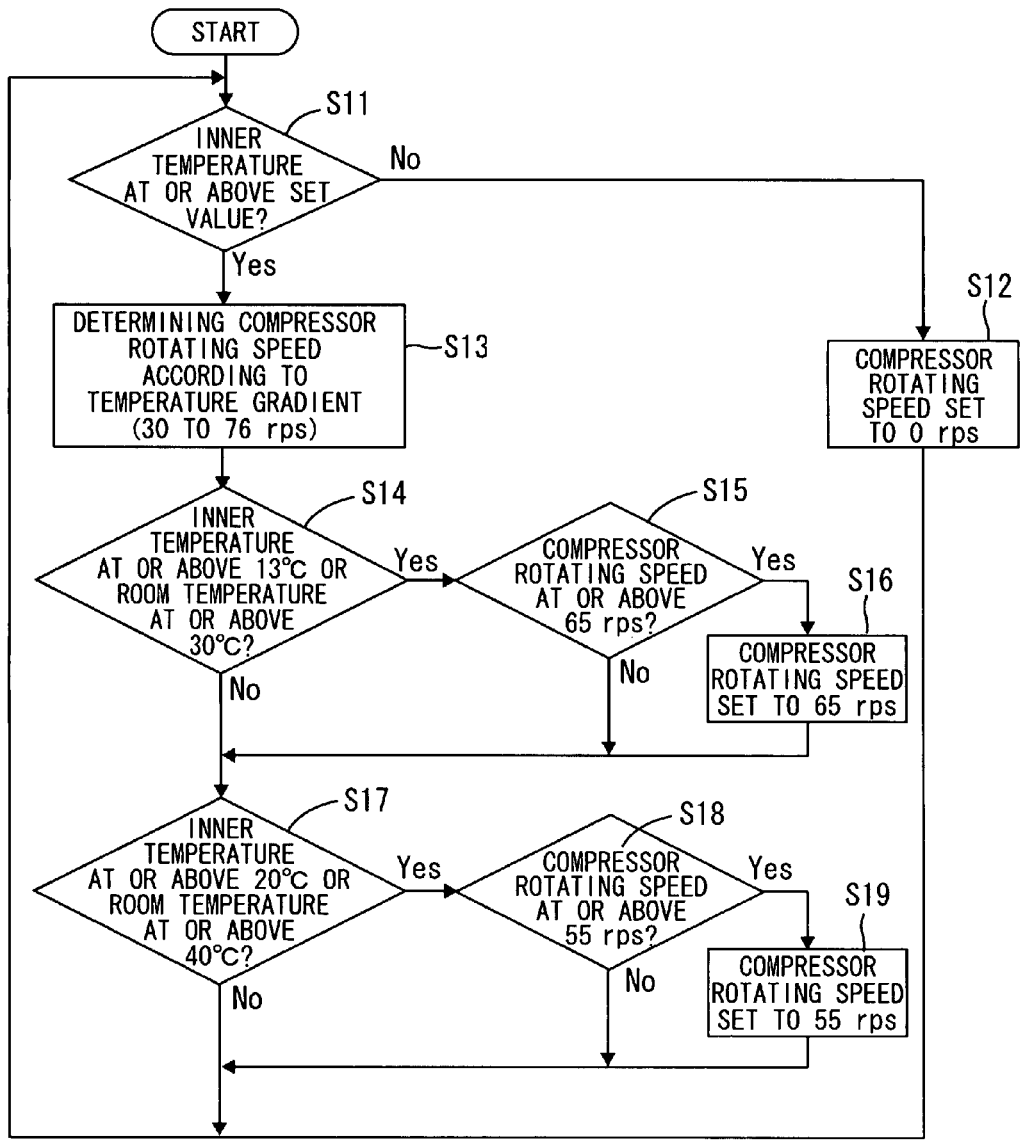
FIG. 3 is a flowchart mainly showing the contents of a routine for determining an upper limit speed.

The following describes the relationships between the inner temperature Tx, and the cooling capacity of the refrigeration cycle 20 and the electrical current flowing into the motor 25. FIG. 2 shows characteristic graphs indicative of the above-noted relationships. Two-dot chain line in FIG. 2 indicates a characteristic line of thermal load relative to the inner temperature Tx. Thermal load refers to a sum total of a thermal amount externally invading the storage compartment and an inner calorific value in the storage compartment. According to the aforenoted characteristic line, it can be understood that the thermal load is increased as the inner temperature Tx becomes lower.

Furthermore, an upper solid line, broken line and alternate long and short dash line in FIG. 2 denote change characteristics of the cooling capacity of the refrigeration cycle 20 in the cases where the motor 25 is rotated at high, middle and low speeds relative to the inner temperature Tx, respectively. It can be understood from FIG. 2 that the cooling capacity of the refrigeration cycle 20 becomes higher as the rotating speed of the motor is increased and as the inner temperature Tx rises. Furthermore, the cooling capacity of the storage compartment is defined by the difference between the cooling capacity of the refrigeration cycle 20 and the thermal load. It can also be understood that the cooling capacity of the storage compartment becomes higher as the rotating speed of the motor is increased and as the inner temperature Tx rises.

Furthermore, a lower solid line, broken line and alternate long and short dash line in FIG. 2 denote change characteristics of currents flowing into the motor 25 in the cases where the motor 25 is rotated at high, middle and low speeds relative to the inner temperature Tx, respectively. It can be understood from FIG. 2 that the current flowing into the motor 25 becomes larger as the rotating speed of the motor 25 is increased and as the inner temperature Tx rises. Dashed line in FIG. 2 denotes maximum allowable current Imax (rated current) of the motor 25 and power supply circuit 40. It can be understood that current equal to or larger than the maximum allowable current Imax tends to flow into the motor 25 as the inner temperature Tx rises with increase in the motor speed. Accordingly, in the embodiment, the maximum allowable current (rated current) of the power supply circuit 40 is determined so as to correspond to the maximum allowable current Imax of the motor 25. Dots in the graph of FIG. 2 denote a region (restricted region) where the refrigeration cycle 20 cannot give sufficient cooling capacity.

The following describes the operation of the refrigerator provided with the refrigeration cycle 20 having the above-described properties. Firstly, the user sets the inner temperature setter to a desired value, or a set temperature Ts. Thereafter, when the user further operates another switch or the like to start the refrigerator, the microcomputer 31 delivers operation commands to the fan drive circuits 26A and 27A so that the cooling fan 26 and compartment fan 27 are driven. Furthermore, the microcomputer 31 reads the current inner temperature Tx detected by the inner temperature sensor 34. The microcomputer 31 compares the read inner temperature Tx with the set temperature Ts (see step S11 in FIG. 3). When Tx<Ts, the microcomputer 31 stops the operation of the inverter circuit 32 so that the motor 25, and accordingly the compressor 21, are stopped (step S12). When Tx≧Ts, the microcomputer 31 delivers a frequency command signal to the inverter circuit 32 so that the inverter circuit 32 supplies alternating current with a predetermined frequency to rotate the motor 25 at a rotating speed according to the frequency of the alternating current (step S13).

For example, a range from 30 rps to 76 rps (revolution per second) is set as the rotating speed of the motor 25 in driving the compressor 21. The rotating speed of the motor 25 is determined according to current change in the inner temperature Tx (temperature gradient). More specifically, for example, a cooling operation called "pull-down mode" is carried out from the start of operation of the refrigeration cycle (the inner temperature is substantially equal to the room temperature) to the time of reach of a set refrigeration temperature (4° C., for example). The microcomputer 31 stores tabulated change modes of the inner temperature to be targeted according to lapsed time in a period of the pull-down mode. The rotating speed of the motor 25 to be set is adapted to be rendered higher as a temperature gradient of actually measured inner temperature is smaller than a target temperature gradient derived from the table. Furthermore, regarding the operation after completion of the pull-down mode, the microcomputer 31 stores data of target temperature gradients for the cooling operation. When the inner temperature rises such that the refrigeration cycle is to be operated, the target temperature gradient is compared with an actual temperature gradient. In this case, too, the rotating speed of the motor 25 to be set is adapted to be rendered higher as the actual temperature gradient is smaller than the target temperature gradient. Consequently, a temperature gradient tends to become small when the compartment load such as food or the like is large. However, the aforesaid control manner is advantageous since the control manner can rotate the motor 25 at high speeds such that the freezing capacity can be increased.

Even when the aforesaid pull-down mode or a normal refrigerating operation is to be carried out, a temperature gradient can become small when a compartment load is large. In this case, the motor 25 is sometimes driven at the maximum speed (an upper limit speed). In the embodiment, the upper limit speed is not merely set to the maximum value of the above-described rotating speed range (here, 76 rps) but the rotating speed is limited as follows.

More specifically, the microcomputer 31 determines at step S14 whether or not the inner temperature Tx is at or above 13° C. or whether or not the room temperature Ty is at or above 30° C. When determining in the affirmative (Yes), the microcomputer 31 then determines whether or not the current rotating speed of the motor 25 is at or above 65 rps. The determination at step S15 actually depends upon the value of frequency command signal the microcomputer 31 supplies to the inverter circuit 32. When the rotating speed is at or above 65 rps, the microcomputer 31 maintains the rotating speed or reduces the rotating speed to 65 rps (step S16). Furthermore, when determining in the negative (No) at step S14 or S15 and the rotating speed is set to 65 rps at step S16, the microcomputer 31 advances to step S17 to determine whether or not the inner temperature is at or above 20° C. or whether or not the room temperature is at or above 40° C. When determining in the affirmative (Yes) at step S17, the microcomputer 31 determines whether or not the rotating speed of the motor 25 is at or above 55 rps (step S18). When the rotating speed is at or above 55 rps, the microcomputer 31 maintains the rotating speed or reduces the motor speed to 55 rps (step S19).

Figure 4:
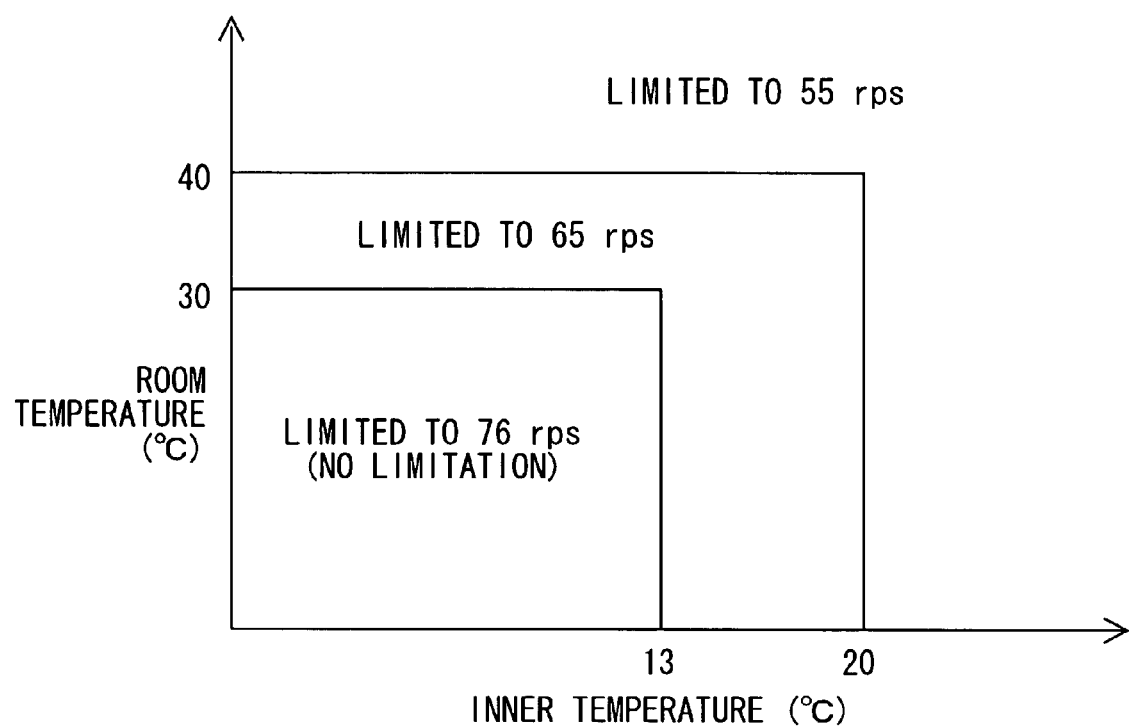
FIG. 4 is a graph showing the relationship the interior temperature of the refrigerator and room temperature, and the upper limit speed.

The upper limit rotating speed is limited to 55 rps when the room temperature Ty is at or below 30° C. and the inner temperature Tx is above 20° C. as the result of processing at steps S14 to S19 (an upper limit rotating speed determining routine). When the inner temperature Tx is at or below 13° C. and ranges from 13° C. to 20° C., the upper limit rotating speed is limited to 65 rps. The upper limit rotating speed is not reduced but is maintained at 76 rps determined at step S13 when the inner temperature Tx is at or below 13° C. Furthermore, in a case where the room temperature is above 30° C. and is at or below 40° C., the upper limit rotating speed is limited to 55 rps when the inner temperature Tx is above 20° C. The upper limit rotating speed is limited to 65 rps when the inner temperature is at or below 20° C. Additionally, when the room temperature Ty is at or above 40° C., the upper limit rotating speed is usually limited to 55 rps irrespective of the room temperature Ty. FIG. 4 shows the aforesaid relations.

The refrigeration cycle 20 of the above-described type has a characteristic that under the condition where the inner temperature Tx is the same, an input current is lower when the room temperature is low than when the room temperature Ty is high at the same rotating speed of the motor. Accordingly, the rotating speed can further be increased under the condition of the same power supply capacity so that the input current can be increased, namely, a performance margin is high. Furthermore, the refrigeration cycle 20 has a characteristic that under the condition where the room temperature Ty is the same, an input current is lower when the inner temperature Tx is low than when the inner temperature Tx is high at the same rotating speed of the motor. Accordingly, the rotating speed can further be increased under the condition of the same power supply capacity so that the input current can be increased, namely, a performance margin is high. In this embodiment, the microcomputer 31 then determines the upper limit rotating speed in the above-described manner based on signals from the inner temperature sensor 34 and the room temperature sensor 35. The upper limit rotating speed is controlled to become higher when the inner temperature Tx or the room temperature Ty is low. Accordingly, when the performance margin is high, the maximum refrigerating capacity can be exerted within a range allowed by the power supply circuit 40. Consequently, for example, even when the inner temperature Tx is approximate to the room temperature Ty immediately after start of the operation of the refrigeration cycle 20, the above-described control manner can shorten a time necessary for refrigeration to reach the set temperature Ts. Furthermore, even when a large amount of warm food or the like is put into the storage compartment during operation of the refrigeration cycle 20, the above-described control manner can shorten a time necessary for refrigeration of the large amount of warm food or the like to reach the set temperature Ts.

On the other hand, the upper limit rotating speed is suppressed so as to be lower when the room temperature Ty or the inner temperature Tx is high (the performance margin is low). Accordingly, the current flowing into the motor 25 and the power supply circuit 40 can be suppressed to or below a maximum allowable current with sufficient use of cooling capacity of the refrigeration cycle 20. Consequently, each of the motor 25 and the power supply circuit 40 can avoid increases in the size and production cost. Furthermore, since a load at the time of start of the refrigerator or the compressor 21 is suppressed as described above, each of the compressor 21 and the condenser 22 can avoid an unnecessary increase in the capacity thereof. As a result, the production or service costs of the compressor 21 and the condenser 22 can be reduced.

Furthermore, in the first embodiment, the refrigeration cycle 20 is controlled in a steady operation after the start so that the rotating speed of the motor 25 is rendered higher as the temperature gradient of the inner temperature Tx is increased, namely, the cooling capacity of the refrigeration cycle 20 is rendered higher. Accordingly, the inner temperature Tx sometimes changes suddenly from the set temperature Ts under the steady operation of the refrigerator when one or more articles to be cooled are newly put into the storage compartment, when articles which have already been cooled are taken out of the storage compartment, or the like. In this case, the compressor 21 is operated at high speeds so that the cooling capacity is rendered higher, whereby a temperature increase in the storage compartment is corrected quickly and accurately, and the inner temperature Tx is maintained substantially at the set temperature Ts in the steady operation of the refrigeration cycle.

<Second Embodiment>

Figure 5:
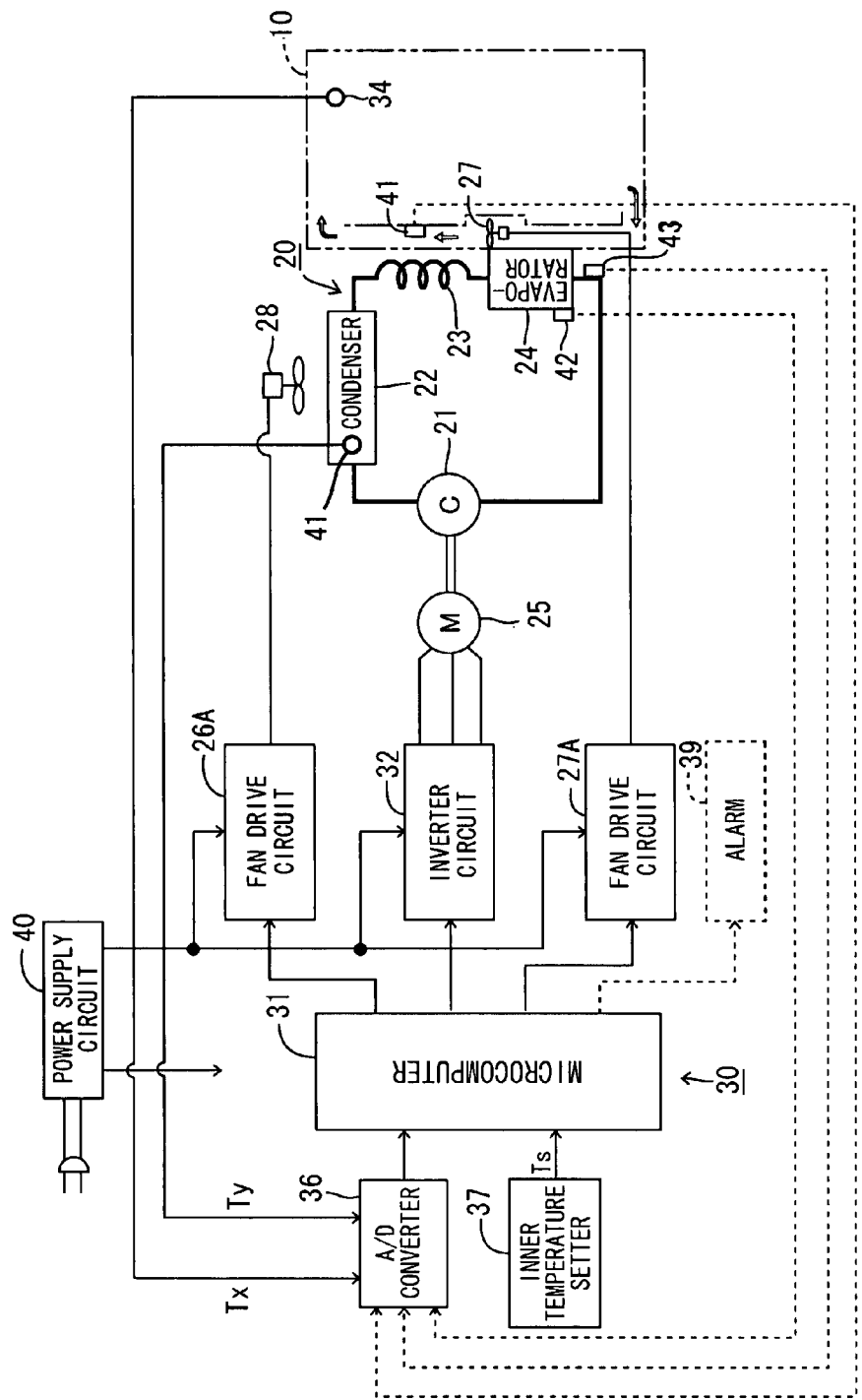
FIG. 5 is a block diagram showing an electrical arrangement of a refrigerator in accordance with a second embodiment of the present invention.
Figure 6:
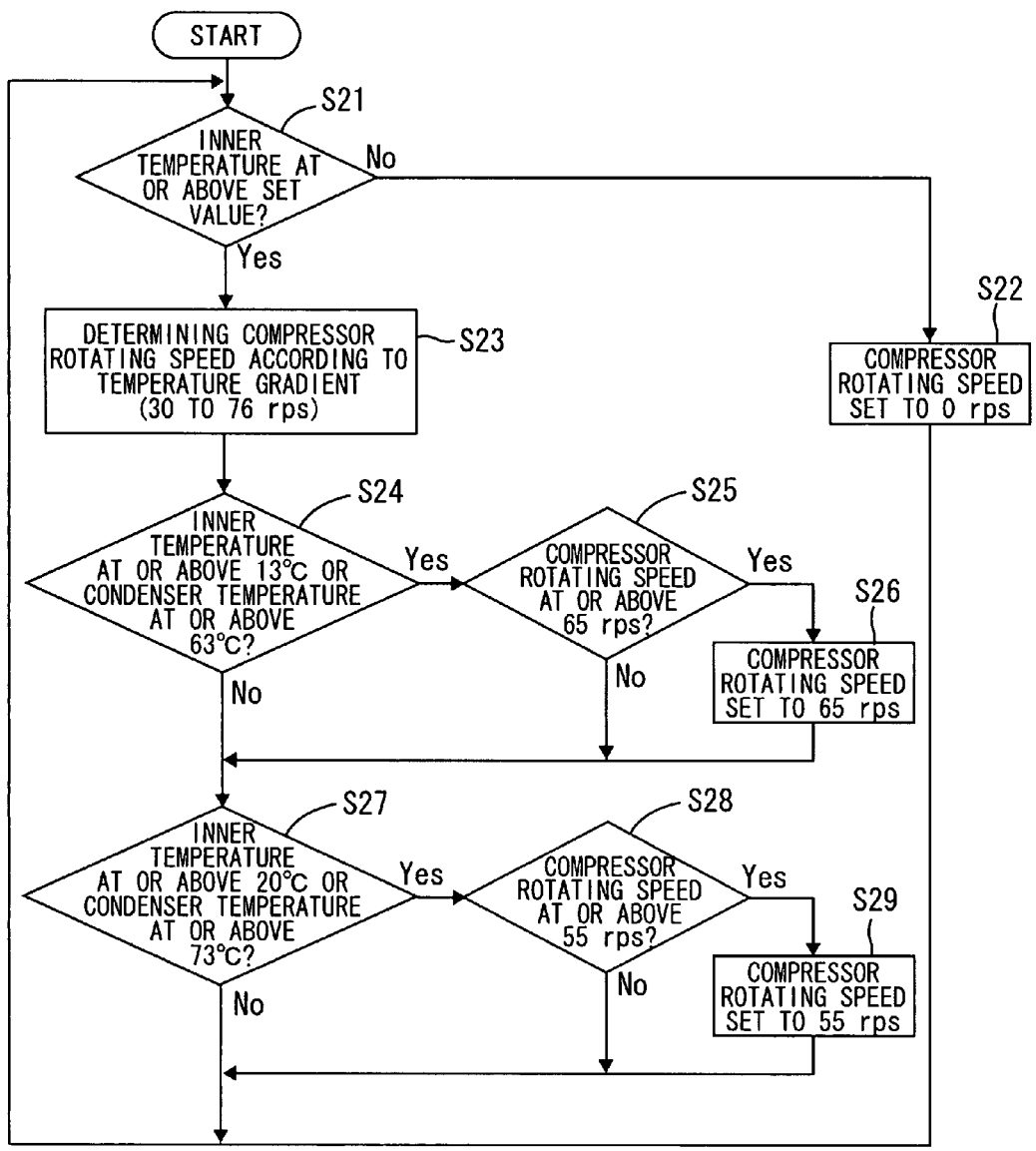
FIG. 6 is a flowchart mainly showing the contents of a routine for determining an upper limit speed in the second embodiment.
Figure 7:
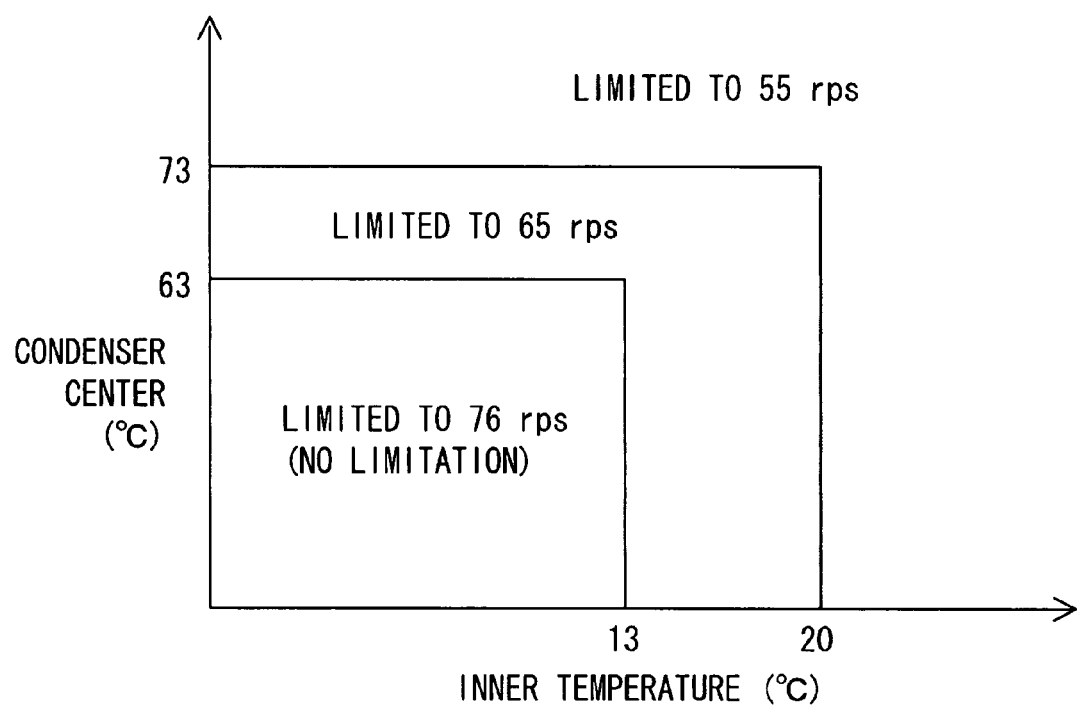
FIG. 7 is a graph showing the relationship the inner temperature of the refrigerator and condenser temperature, and the upper limit speed in the second embodiment.

FIGS. 5 to 7 illustrate a second embodiment of the invention. The performance margin of the refrigeration cycle 20 is detected based on a temperature of the condenser 22 in the second embodiment. The temperature of the condenser 22 rises when the thermal load is larger as compared with an amount of heat discharged from the condenser 22 such that the performance margin of the refrigeration cycle 20 is reduced. In view of this increase in the temperature of the condenser 22, a condenser temperature sensor 41 such as a thermistor is provided in a central part of the condenser 22 in the second embodiment as shown in FIG. 5. The refrigerator of the second embodiment is similar to the refrigerator of the first embodiment in the other respect except for the software arrangement of the microcomputer 31. Accordingly, identical or similar parts in the second embodiment are labeled by the same reference symbols, and description of these identical or similar parts will be eliminated.

The upper limit rotating speed is determined in the following manner in the second embodiment. More specifically, the microcomputer 31 determines at step S24 whether or not the inner temperature Tx is at or above 13° C. or whether or not the condenser temperature is at or above 63° C. When determining in the affirmative (Yes), the microcomputer 31 then determines whether or not the current rotating speed of the motor 25 is at or above 65 rps. The determination at step S25 actually depends upon the value of frequency command signal the microcomputer 31 supplies to the inverter circuit 32. When the rotating speed is at or above 65 rps, the microcomputer 31 maintains the rotating speed or reduces the rotating speed to 65 rps (step S26). Furthermore, when determining in the negative (No) at step S24 or S25 and the rotating speed is set to 65 rps at step S26, the microcomputer 31 advances to step S27 to determine whether or not the inner temperature is at or above 20° C. or whether or not the condenser temperature is at or above 73° C. When determining in the affirmative (Yes) at step S27, the microcomputer 31 determines whether or not the rotating speed of the motor 25 is at or above 55 rps (step S28). When the rotating speed is at or above 55 rps, the microcomputer 31 maintains the rotating speed or reduces the motor speed to 55 rps (step S29).

The upper limit rotating speed is limited to 55 rps when the room temperature Ty is at or below 30° C. and the condenser temperature is above 73° C. as the result of processing at steps S24 to S29 (an upper limit rotating speed determining routine). When the inner temperature Tx is at or below 20° C. and the condenser temperature ranges from 63° C. to 73° C., the upper limit rotating speed is limited to 65 rps. The upper limit rotating speed is not reduced but is maintained at 76 rps determined at step S23 when the inner temperature Tx is at or below 13° C. Furthermore, in a case where the condenser temperature is above 63° C. and is at or below 73° C., the upper limit rotating speed is limited to 55 rps when the inner temperature Tx is above 20° C. The upper limit rotating speed is limited to 65 rps when the inner temperature Tx is at or below 20° C. Additionally, when the condenser temperature is at or above 73° C., the upper limit rotating speed is usually limited to 55 rps irrespective of the room temperature Ty. FIG. 7 shows the aforesaid relations.

According to the second embodiment, the microcomputer 31 determines the upper limit rotating speed in the above-described manner based on signals from the inner temperature sensor 34 and the room temperature sensor 35. The upper limit rotating speed is controlled to become higher when the inner temperature Tx or the condenser temperature is low. Accordingly, when the performance margin is high, the maximum refrigerating capacity can be exerted within a range allowed by the power supply circuit 40. Consequently, for example, even when the inner temperature Tx is approximate to the room temperature Ty immediately after start of the operation of the refrigeration cycle 20, the above-described control manner can shorten a time necessary for refrigeration to reach the set temperature Ts. Furthermore, even when a large amount of warm food or the like is put into the storage compartment during operation of the refrigeration cycle 20, the above-described control manner can shorten a time necessary for refrigeration of the large amount of warm food or the like to reach the set temperature Ts.

On the other hand, the upper limit rotating speed is suppressed so as to be lower when the room temperature Ty or the inner temperature Tx is high (the performance margin is low). Accordingly, the current flowing into the motor 25 and the power supply circuit 40 can be suppressed to or below a maximum allowable current with sufficient use of cooling capacity of the refrigeration cycle 20. Consequently, each of the motor 25 and the power supply circuit 40 can avoid increases in the size and production cost. Furthermore, since a load at the time of start of the refrigerator or the compressor 21 is suppressed as described above, each of the compressor 21 and the condenser 22 can avoid an unnecessary increase in the capacity thereof. As a result, the production or service cost of the condenser 22 can be reduced.

<Third Embodiment>

Figure 8:
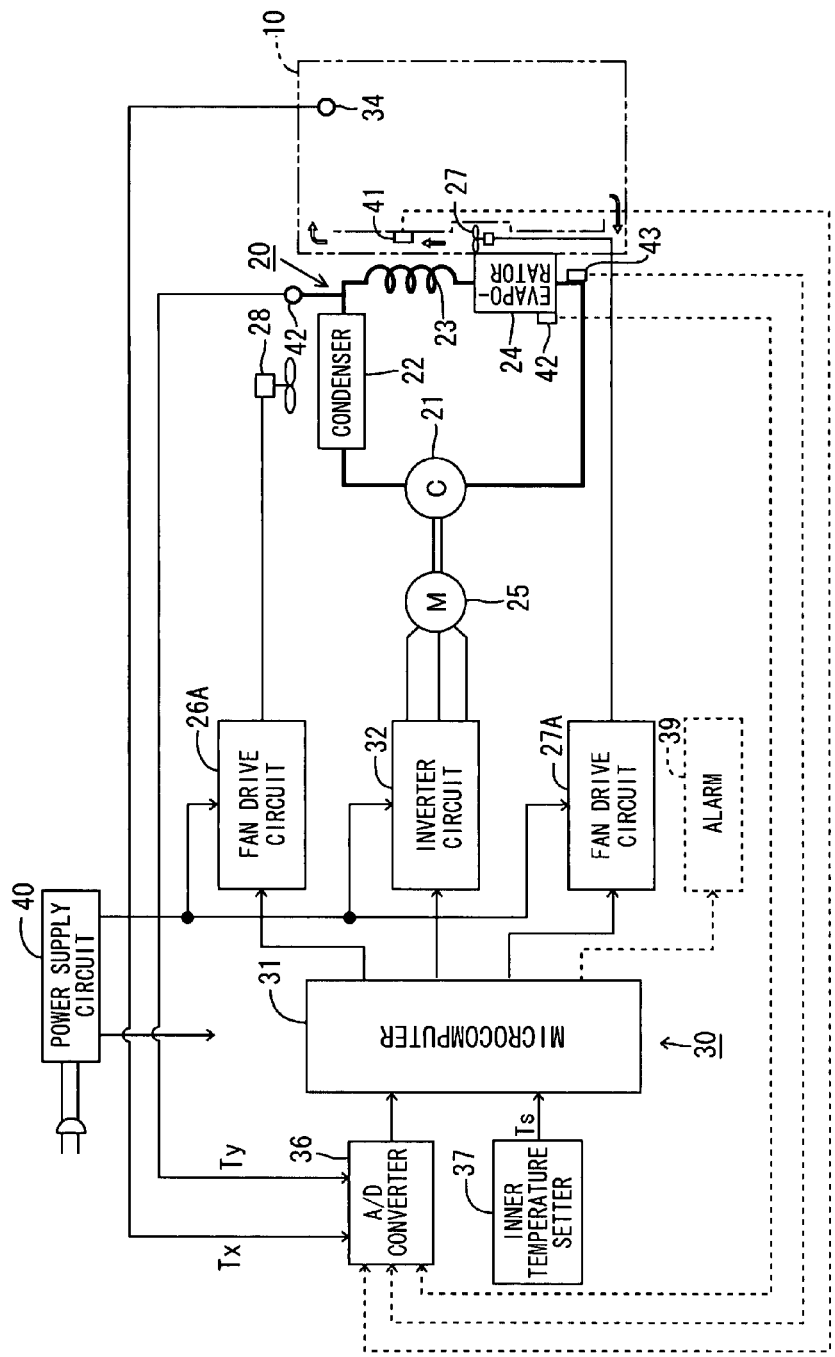
FIG. 8 is a block diagram showing an electrical arrangement of a refrigerator in accordance with a third embodiment of the present invention.
Figure 9:
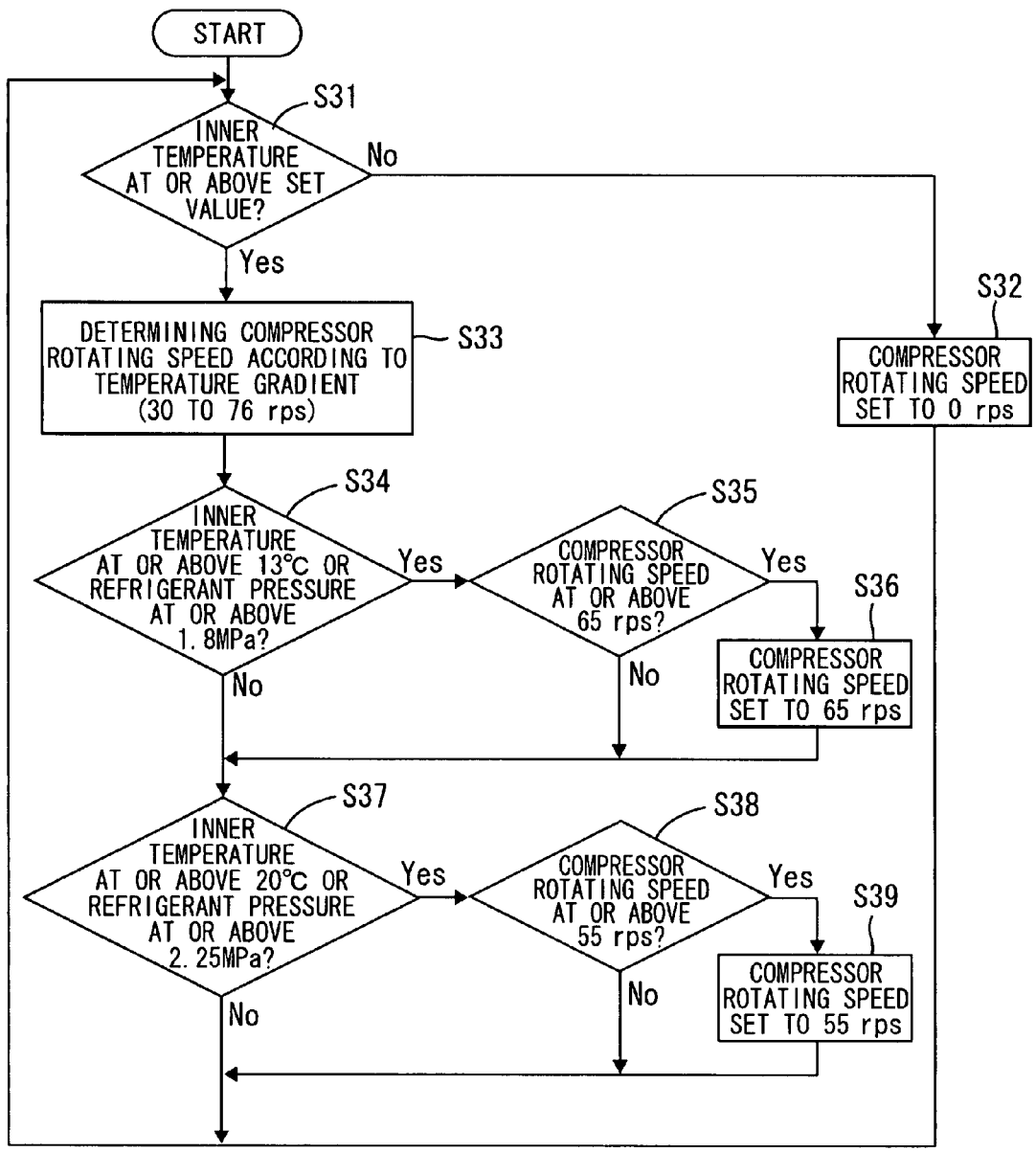
FIG. 9 is a flowchart mainly showing the contents of a routine for determining an upper limit speed in the third embodiment.
Figure 10:
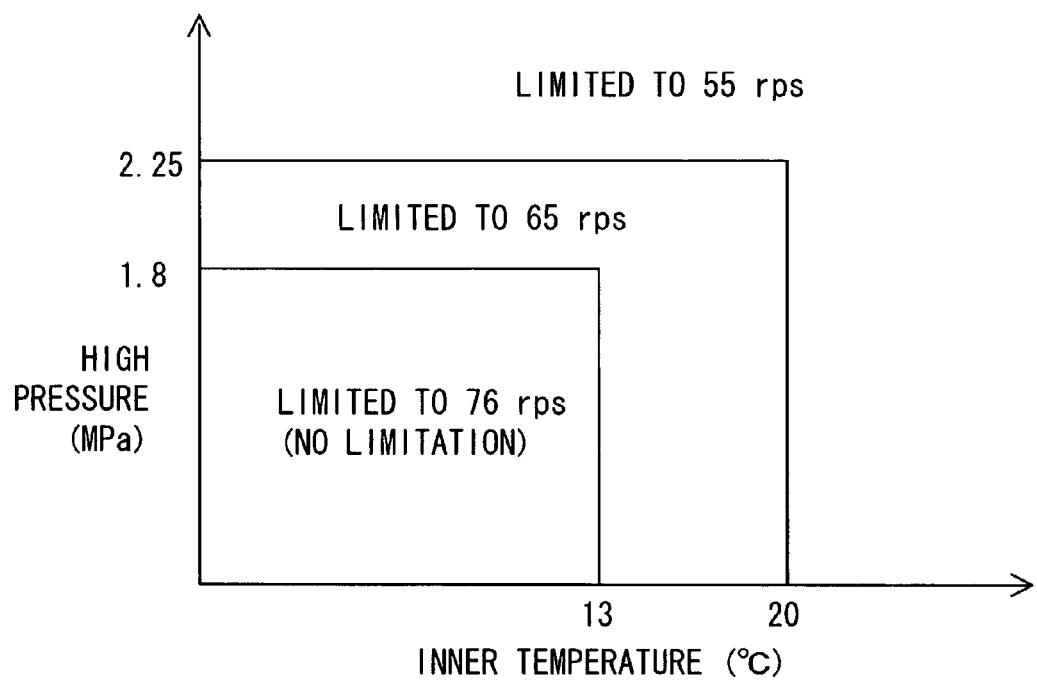
FIG. 10 is a graph showing the relationship the inner temperature of the refrigerator and pressure, and the upper limit speed in the third embodiment.

FIGS. 8 to 10 illustrate a third embodiment of the invention. The performance margin of the refrigeration cycle 20 is detected based on pressure at the high-pressure side of the refrigeration cycle 20 in the third embodiment. The refrigerant pressure is increased between the discharge side of the compressor 21 and the capillary tube 23 when the thermal load is larger as compared with an amount of heat discharged from the condenser 22 such that the performance margin of the refrigeration cycle 20 is reduced. In view of this increase in the refrigerant pressure, a refrigerant pressure sensor 42 is provided in a pipe passage between the discharge side of the compressor 21 and the condenser 22 (in particular, the inlet side of the capillary tube 23) as shown in FIG. 8. The refrigerant pressure sensor 42 detects refrigerant pressure. The refrigerator of the third embodiment is similar to the refrigerator of the first embodiment in all other respects except for the software arrangement of the microcomputer 31. Accordingly, identical or similar parts in the third embodiment are labeled by the same reference symbols, and description of these identical or similar parts will be omitted.

The upper limit rotating speed is determined in the following manner in the third embodiment. More specifically, the microcomputer 31 determines at step S34 whether or not the inner temperature Tx is at or above 13° C. or whether or not the refrigerant pressure is at or above 1.8 MPa. When determining in the affirmative (Yes), the microcomputer 31 then determines whether or not the current rotating speed of the motor 25 is at or above 65 rps. The determination at step S35 actually depends upon the value of frequency command signal the microcomputer 31 supplies to the inverter circuit 32. When the rotating speed is at or above 65 rps, the microcomputer 31 maintains the rotating speed or reduces the rotating speed to 65 rps (step S36). Furthermore, when determining in the negative (No) at step S34 or S35 and when the rotating speed is set to 65 rps at step S36, the microcomputer 31 advances to step S37 to determine whether or not the inner temperature is at or above 20° C. or whether or not the refrigerant pressure is at or above 2.25 MPa. When determining in the affirmative (Yes) at step S37, the microcomputer 31 determines whether or not the rotating speed of the motor 25 is at or above 55 rps (step S38). When the rotating speed is at or above 55 rps, the microcomputer 31 maintains the rotating speed or reduces the motor speed to 55 rps (step S39).

The upper limit rotating speed is limited to 55 rps when the room temperature Ty is at or below 30° C. and the refrigerant pressure is above 2.25 MPa as the result of processing at steps S34 to S39 (an upper limit rotating speed determining routine). When the inner temperature Tx is at or below 20° C. and the refrigerant pressure ranges from 1.8 MPa to 2.25 MPa, the upper limit rotating speed is limited to 65 rps. The upper limit rotating speed is not reduced but is maintained at 76 rps determined at step S33 when the inner temperature Tx is at or below 13° C. Furthermore, in a case where the refrigerant pressure is above 1.8 MPa and is at or below 2.25 MPa, the upper limit rotating speed is limited to 55 rps when the inner temperature Tx is above 20° C. The upper limit rotating speed is limited to 65 rps when the inner temperature Tx is at or below 20° C. Additionally, when the refrigerant pressure is at or above 2.25 MPa, the upper limit rotating speed is usually limited to 55 rps irrespective of the room temperature Ty. FIG. 10 shows the aforesaid relations.

According to the third embodiment, the microcomputer 31 determines the upper limit rotating speed in the above-described manner based on signals from the inner temperature sensor 34 and the refrigerant pressure sensor 42. The upper limit rotating speed is controlled to become higher when the inner temperature Tx or the refrigerant pressure is low. Accordingly, when the performance margin is high, the maximum refrigerating capacity can be exerted within a range allowed by the power supply circuit 40. Consequently, for example, even when the inner temperature Tx is approximate to the room temperature Ty immediately after start of the operation of the refrigeration cycle 20, the above-described control manner can shorten a time necessary for refrigeration to reach the set temperature Ts. Furthermore, even when a large amount of warm food or the like is put into the storage compartment during operation of the refrigeration cycle 20, the above-described control manner can shorten a time necessary for refrigeration of the large amount of warm food or the like to reach the set temperature Ts.

On the other hand, the upper limit rotating speed is suppressed so as to be lower when the room temperature Ty or the inner temperature Tx is high (the performance margin is low). Accordingly, the current flowing into the motor 25 and the power supply circuit 40 can be suppressed to or below a maximum allowable current with sufficient use of cooling capacity of the refrigeration cycle 20. Consequently, each of the motor 25 and the power supply circuit 40 can avoid increases in the size and production cost. Furthermore, since a load at the time of start of the refrigerator or the compressor 21 is suppressed as described above, each of the compressor 21 and the condenser 22 can avoid an unnecessary increase in the capacity thereof. As a result, the production or service cost of the condenser 22 can be reduced.

Moreover, the performance margin is detected based on the refrigerant pressure in the above-described arrangement. Accordingly, the performance margin of the refrigeration cycle 20 can be computed more accurately as compared with the case where the performance margin is detected based on the condenser temperature as in the second embodiment. This accuracy in the performance margin computation can be achieved even when a sufficient cooling air volume cannot be ensured for the reason of a reduction in the cooling capacity due to dirt on the condenser or depending upon circumstances in which the refrigerator is installed.

<Other Embodiments>

The present invention is not limited by the embodiments described above and with reference to the drawings. For example, the technical scope of the invention encompasses the following embodiments.

(1) Although the invention is applied to the refrigerator in each foregoing embodiment, the invention may be applied to a cooling apparatus which comprises a refrigeration cycle and cools an object by a cooling operation of an evaporator of the refrigeration cycle, for example, ice makers, air conditioners or the like.

(2) The sensor detecting the room temperature is provided at the inlet side of the cooling fan 26 in the first embodiment. However, the sensor may be disposed at other locations as long as the temperature of air cooling the condenser can be measured.

(3) The condenser temperature sensor 41 is provided in the central part of the condenser 22 in the second embodiment. However, the condenser temperature sensor 41 may be positioned elsewhere so as to detect a temperature of cooling air having passed through the condenser 22.

(4) The pressure sensor which measures the pressure of the refrigerant is provided near the inlet of the capillary tube in the third embodiment. However, the refrigerant pressure may be measured at any location between the outlet side of the compressor and the capillary tube.

The foregoing description and drawings are merely illustrative of the principles of the present invention and are not to be construed in a limiting sense. Various changes and modifications will become apparent to those of ordinary skill in the art. All such changes and modifications are considered to be within the scope of the invention as defined by the appended claims.

What is claimed is:

1. A refrigerator comprising:
   a heat-insulated box having a storage compartment for housing an object to be cooled;
   a refrigeration cycle including a compressor configured to be driven by an electric motor having a controllable rotating speed, a condenser cooling refrigerant configured to be discharged from the compressor, a throttle valve configured to enable the refrigerant discharged from the condenser to pass therethrough and an evaporator configured to perform a cooling operation by the refrigerant having passed through the throttle valve;
   an inner fan configured to circulate cold air produced by a cooling action of the evaporator into the storage compartment;
   a first physical quantity detector configured to detect a physical quantity representing a temperature of an object to be cooled by the cooling operation of the evaporator;
   a temperature control device configured to control a rotating speed of the motor based on the physical quantity detected by the first physical quantity detector so that the object is cooled approximately to a target temperature;
   a second physical quantity detector configured to detect a physical quantity corresponding to a performance margin of the refrigeration cycle; and
   a rotating speed control device configured to determine an upper limit of the rotating speed of the motor and control the rotating speed of the motor at or below the upper limit, the determination of the upper limit being based on a physical quantity detected by the second physical quantity detector;
   wherein the second physical quantity detector comprises a temperature sensor configured to detect a room temperature in the area surrounding but not within the refrigerator,
   wherein the rotating speed control device is configured to determine the upper limit such that the upper limit increases as the room temperature in the area surrounding but not within the refrigerator decreases;
   wherein the temperature control device is configured to control the rotating speed of the motor in a range from a lower limit to the upper limit determined by the rotating speed control device, so as to maintain the temperature of the object to be cooled at approximately the target temperature;
   wherein the rotating speed control device is configured to determine the lower limit;
   wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and
   wherein the rotating speed control device is configured to determine the upper limit further based on the physical quantity detected by the first physical quantity detector, such that the upper limit increases as the physical quantity detected by the first physical quantity detector decreases.

2. A refrigerator comprising:
   a heat-insulated box having a storage compartment for housing an object to be cooled;
   a refrigeration cycle including a compressor configured to be driven by an electric motor having a controllable rotating speed, a condenser cooling refrigerant configured to be discharged from the compressor, a throttle valve configured to enable the refrigerant discharged from the condenser to pass therethrough and an evaporator configured to perform a cooling operation by the refrigerant having passed through the throttle valve;
   an inner fan configured to circulate cold air produced by a cooling action of the evaporator into the storage compartment;
   a first physical quantity detector configured to detect a physical quantity representing a temperature of an object to be cooled by the cooling operation of the evaporator;
   a temperature control device configured to control a rotating speed of the motor based on the physical quantity detected by the first physical quantity detector so that the object is cooled approximately to a target temperature;
   a second physical quantity detector configured to detect a physical quantity corresponding to a performance margin of the refrigeration cycle; and
   a rotating speed control device configured to determine an upper limit of the rotating speed of the motor and control the rotating speed of the motor at or below the upper limit, the determination of the upper limit being based on a physical quantity detected by the second physical quantity detector;
   wherein the second physical quantity detector comprises a temperature sensor configured to detect a temperature of cooling air having passed through the condenser,
   wherein the rotating speed control device is configured to determine the upper limit such that the upper limit increases as the temperature of cooling air having passed through the condenser decreases;
   wherein the temperature control device is configured to control the rotating speed of the motor in a range from a lower limit to the upper limit determined by the rotating speed control device, so as to maintain the temperature of the object to be cooled at approximately the target temperature;

wherein the rotating speed control device is configured to determine the lower limit;

wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and wherein the rotating speed control device is configured to determine the upper limit further based on the physical quantity detected by the first physical quantity detector, such that the upper limit increases as the physical quantity detected by the first physical quantity detector decreases.

3. A refrigerator comprising:

a heat-insulated box having a storage compartment for housing an object to be cooled;

a refrigeration cycle including a compressor configured to be driven by an electric motor having a controllable rotating speed, a condenser cooling refrigerant configured to be discharged from the compressor, a throttle valve configured to enable the refrigerant discharged from the condenser to pass therethrough and an evaporator configured to perform a cooling operation by the refrigerant having passed through the throttle valve;

an inner fan configured to circulate cold air produced by a cooling action of the evaporator into the storage compartment;

a first physical quantity detector configured to detect a physical quantity representing a temperature of an object to be cooled by the cooling operation of the evaporator;

a temperature control device configured to control a rotating speed of the motor based on the physical quantity detected by the first physical quantity detector so that the object is cooled approximately to a target temperature;

a second physical quantity detector configured to detect a physical quantity corresponding to a performance margin of the refrigeration cycle; and a rotating speed control device configured to determine an upper limit of the rotating speed of the motor and control the rotating speed of the motor at or below the upper limit, the determination of the upper limit being based on a physical quantity detected by the second physical quantity detector;

wherein the second physical quantity detector comprises a pressure sensor configured to measure a pressure of the refrigerant located at a section of the refrigeration cycle from a discharge side of the compressor to throttle valve, wherein the rotating speed control device is configured to determine the upper limit such that the upper limit increases as the pressure of the refrigerant located at a section of the refrigeration cycle from a discharge side of the compressor to throttle valve decreases;

wherein the temperature control device is configured to control the rotating speed of the motor in a range from a lower limit to the upper limit determined by the rotating speed control device, so as to maintain the temperature of the object to be cooled at approximately the target temperature;

wherein the rotating speed control device is configured to determine the lower limit;

wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and wherein the rotating speed control device is configured to determine the upper limit further based on the physical quantity detected by the first physical quantity detector, such that the upper limit increases as the physical quantity detected by the first physical quantity detector decreases.

4. A cooling apparatus comprising:

a refrigeration cycle including a compressor configured to be driven by an electric motor and having a controllable rotating speed, a condenser cooling refrigerant configured to be discharged from the compressor, a throttle valve configured to enable the refrigerant discharged from the condenser to pass therethrough, and an evaporator capable of a cooling operation when the refrigerant is passed through the throttle valve;

a first physical quantity detector configured to detect a physical quantity representing a temperature of an object to be cooled by the cooling operation of the evaporator;

a temperature control device configured to control the rotating speed of the motor based on the physical quantity detected by the first physical quantity detector so that the object is cooled approximately to a target temperature;

a second physical quantity detector configured to detect a physical quantity corresponding to a performance margin of the refrigeration cycle; and a rotating speed control device configured to determine an upper limit of the rotating speed of the motor and configured to control the rotating speed of the motor at or below the upper limit, the determination of the upper limit being based on a physical quantity detected by the second physical quantity detector, wherein the second physical quantity detector includes a temperature sensor capable of detecting a room temperature in the area surrounding but not within the cooling apparatus, wherein the rotating speed control device is configured to determine the upper limit such that the upper limit increases as the room temperature in the area surrounding but not within the refrigerator decreases;

wherein the temperature control device is configured to control the rotating speed of the motor in a range from a lower limit to the upper limit determined by the rotating speed control device, so as to maintain the temperature of the object to be cooled at approximately the target temperature;

wherein the rotating speed control device is configured to determine the lower limit;

wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and wherein the rotating speed control device is configured to determine the upper limit further based on the physical quantity detected by the first physical quantity detector, such that the upper limit increases as the physical quantity detected by the first physical quantity detector decreases.

5. A cooling apparatus comprising:

a refrigeration cycle including a compressor capable of being driven by an electric motor and having a controllable rotating speed, a condenser cooling refrigerant capable of being discharged from the compressor, a throttle valve capable of enabling the refrigerant discharged from the condenser to pass therethrough and an evaporator capable of a cooling operation when the refrigerant is passed through the throttle valve;

a first physical quantity detector capable of detecting a physical quantity representing a temperature of an object to be cooled by the cooling operation of the evaporator;

a temperature control device capable of controlling a rotating speed of the motor based on the physical quantity detected by the first physical quantity detector so that the object is cooled approximately to a target temperature;

a second physical quantity detector capable of detecting a physical quantity corresponding to a performance margin of the refrigeration cycle; and a rotating speed control device configured to determine an upper limit of the rotating speed of the motor and control the rotating speed of the motor at or below the upper limit, the determination of the upper limit being based on a physical quantity detected by the second physical quantity detector, wherein the second physical quantity detector includes a temperature sensor capable of detecting a temperature of cooling air having passed through the condenser, wherein the rotating speed control device is configured to determine the upper limit such that the upper limit increases as the temperature of cooling air having passed through the condenser decreases;

wherein the temperature control device is configured to control the rotating speed of the motor in a range from a lower limit to the upper limit determined by the rotating speed control device, so as to maintain the temperature of the object to be cooled at approximately the target temperature;

wherein the rotating speed control device is configured to determine the lower limit;

wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and wherein the rotating speed control device is configured to determine the upper limit further based on the physical quantity detected by the first physical quantity detector, such that the upper limit increases as the physical quantity detected by the first physical quantity detector decreases.

6. A cooling apparatus comprising:

a refrigeration cycle including a compressor capable of being driven by an electric motor and having a controllable rotating speed, a condenser cooling refrigerant capable of being discharged from the compressor, a throttle valve capable of enabling the refrigerant discharged from the condenser to pass therethrough and an evaporator capable of a cooling operation when the refrigerant is passed through the throttle valve;

a first physical quantity detector capable of detecting a physical quantity representing a temperature of an object to be cooled by the cooling operation of the evaporator;

a temperature control device capable of controlling a rotating speed of the motor based on the physical quantity detected by the first physical quantity detector so that the object is cooled approximately to a target temperature;

a second physical quantity detector capable of detecting a physical quantity corresponding to a performance margin of the refrigeration cycle; and a rotating speed control device configured to determine an upper limit of the rotating speed of the motor and control the rotating speed of the motor at or below the upper limit while continuing the operation of the motor, the determination of the upper limit being based on a physical quantity detected by the second physical quantity detector, wherein the second physical quantity detector includes a pressure sensor capable of measuring pressure of the refrigerant located at a section of the refrigeration cycle from a discharge side of the compressor to the throttle valve, wherein the rotating speed control device is configured to determine the upper limit such that the upper limit increases as the pressure of the refrigerant located at a section of the refrigerant cycle from a discharge side of the compressor to throttle valve decreases;

wherein the temperature control device is configured to control the rotating speed of the motor in a range from a lower limit to the upper limit determined by the rotating speed control device, so as to maintain the temperature of the object to be cooled at approximately the target temperature;

wherein the rotating speed control device is configured to determine the lower limit;

wherein the temperature control device is configured to compare a measured temperature gradient of the object to be cooled with a stored target temperature gradient, and to control the rotating speed of the motor such that the rotating speed is set higher if the measured temperature gradient of the object to be cooled is less than the stored target temperature gradient and the rotating speed is set lower if the measured temperature gradient of the object to be cooled is greater than the stored target temperature gradient; and wherein the rotating speed control device is configured to determine the upper limit further based on the physical quantity detected by the first physical quantity detector, such that the upper limit increases as the physical quantity detected by the first physical quantity detector decreases.

* * * * *